United States Patent [19]

Richter et al.

[11] 4,372,711
[45] Feb. 8, 1983

[54] HIGH PRESSURE FEEDING

[75] Inventors: Johan C. F. C. Richter, Nice, France; Michael I. Sherman, Glens Falls, N.Y.

[73] Assignee: Kamyr, Inc., Glens Falls, N.Y.

[21] Appl. No.: 288,487

[22] Filed: Jul. 30, 1981

Related U.S. Application Data

[62] Division of Ser. No. 123,947, Feb. 25, 1980.

[51] Int. Cl.³ .................. B65G 53/30; B65G 53/46
[52] U.S. Cl. ............................. 406/63; 209/380;
   210/409; 210/411; 210/420; 210/432; 406/105
[58] Field of Search ............... 406/62, 63, 105;
   209/380; 210/409, 411, 420, 426, 427, 432

[56] References Cited

U.S. PATENT DOCUMENTS

4,082,368  4/1978  Funk ........................ 406/63 X
4,130,478 12/1978  Swallow .................. 209/380 X

Primary Examiner—Jeffrey V. Nase
Attorney, Agent, or Firm—Cushman, Darby & Cushman

[57] ABSTRACT

A high transfer pressure device, and method, especially adapted for continuously conveying hard particulate material such as coal; and a screen specifically for use in such conveying. The high pressure transfer device includes a pocketed rotor containing a pair of diametrically through-going pockets perpendicular to each other, a housing enclosing the rotor and having four ports spaced around the periphery thereof, and a screen operatively associated with the rotor or the ports for screening out particles above a predetermined size that are conveyed in liquid passed through the device. Preferably the screen is associated with one of the ports of the housing and fluid injection nozzles are associated with the screen for injecting liquid under pressure toward the screen to effect dislodgement of any particles that may be lodged in the screen and thereby prevent damage to the screen. The operation of the fluid injection nozzles is timed to the rotation of the rotor. Alternatively, a particularly designed screen made from bars that are square or circular in cross-section may be located in an enlarged middle portion of each of the pockets.

15 Claims, 9 Drawing Figures

HIGH PRESSURE FEEDING

This is a division of application Ser. No. 123,947 filed Feb. 25, 1980.

BACKGROUND AND SUMMARY OF THE INVENTION

The invention relates to devices and a method especially adapted for conveying hard particulate material, the particles having non-uniform and irregular shapes, such as coal. An especially desirable system and method for conveying such material hydraulically is illustrated and described in U.S. Pat. No. 4,082,368. In that patented system, a high pressure transfer device is utilized for boosting the pressure of the hydraulically conveyed material to effect conveyance thereof along a pipeline and/or from underwater mine sites.

While the system described in the patent is very effective for accomplishing its desired end results, it has been discovered that during use of the system excessively great wear of the screen associated with the high pressure transfer device occurs. In particular, it has been discovered that large grooves are formed in the transverse bars mounting the spaced, elongated bars forming the screen, at one end thereof, the grooves being formed exceptionally quickly so that the apparatus must be shut down and the screens replaced with undesired frequency. According to the present invention it has been determined that the source of the screen wearing problem is the lodging of irregular pieces of the hard material such as granite, basalt, quartz, etc. being conveyed in the screen slots, such lodged pieces being carried along the slots by the rotor of the high pressure transfer device to the ends of the slots, and causing abrading thereof before the particles are broken up.

According to the present invention, a method and apparatus are provided for eliminating the screen wearing problem that occurs in the conveyance of hard particulate material, as discussed above with respect to U.S. Pat. No. 4,082,368 (the disclosure of which is hereby incorporated by reference herein).

According to the method of the present invention, hard particulate material, the particles having non-uniform and irregular shapes, such as coal, is continuously conveyed utilizing a high pressure transfer device including a pocketed rotor containing a pair of diametrically through-going pockets perpendicular to each other, a housing enclosing the rotor and having four ports equally spaced around the periphery thereof for registry with inlets and outlets from the through-going pockets and the rotor, and a screen associated with the housing and rotor for allowing passage of liquid and particles smaller than a predetermined size therethrough, but preventing passage of particles larger than the predetermined size therethrough. Liquid containing the hard particulate material is continuously fed into a first of the housing ports for entry into a through-going pocket of the rotor. The rotor is rotated in a given direction of rotation so that it rotates past each of the housing ports. Withdrawal of liquid introduced through the first port is provided from through-going pockets of the rotor through a third port of the housing, opposite the first port, screening of the particulate material above a predetermined size out of the liquid passing through the port being practiced utilizing the screen. Liquid under high pressure is pumped toward the rotor through a fourth port of the housing, the fourth port being located between the third and first ports in the direction of rotation of the rotor, and withdrawal of liquid is provided through a second port located opposite the fourth port, without screening of the liquid. Prevention of damage to the screen as a result of particles of the hard particulate material being trapped therein and carried along the screen by the rotor into abrading contact with solid portions of the screen is positively prevented. This positive prevention is accomplished in one of two ways: by injecting fluid under pressure into the screen to effect dislodgement of particles that may be lodged in the screen; or by providing a screen interiorly of each of the through-extending pockets, between the inlet and outlet of each pocket.

When prevention of damage to the screen is practiced by injecting fluid under pressure to dislodge particles from the screen, the device according to the invention that is utilized preferably includes a screen having a plurality of elongated bars, elongated in the direction of rotation of the rotor, and means for maintaining the bars in parallel spaced relationship, being spaced in a dimension parallel to the axis of rotation of the rotor. A plurality of fluid injection nozzles are mounted in one of the transverse bars forming the elongated bar supporting means, and the screen is mounted in the third port of the housing. A header may be provided in the transverse bar to which each of the fluid injecting nozzles is connected, each nozzle pointing upwardly towards the tops of the bars in the space between adjacent bars, to effect dislodgement of particles back into a pocket of the rotor. Operation of the fluid injection means is timed to the rotation of the rotor, such as by mounting a cam for rotation with the rotor, and utilizing a linearly movable cam follower for engaging the cam, and means responsive to the linear motion of the cam follower for effecting operation of a valve to supply fluid (preferably liquid) under pressure to the fluid injection nozzles. The transverse bar of the screen with which the fluid injection means is associated provides a rearmost portion of the screen, in the direction of rotation of the rotor, the timing being gauged so that fluid is injected only when a trailing edge, in a direction of rotation of the rotor, of a through-going pocket in the rotor approaches the rearmost portion of the screen.

When the damage prevention to the screen is accomplished by mounting a screen interiorly of each of the through-extending pockets, preferably the pockets are dimensioned so that they are much wider at a middle portion thereof than at the inlets and outlets. The screen in such a situation preferably comprises a plurality of bars that are square or circular in cross-section with means for mounting the bars so that they are parallel to each other and spaced apart in a dimension perpendicular to the direction of flow of liquid through the pockets, and so that the present the same surface configuration or circular to the liquid flowing through the pockets in either direction.

It is the primary object of the present invention to provide an improved device and method for conveying hard particulate material so that screen damage is minimized. This and other objects of the invention will become clear from an inspection of the detailed description of the invention, and from the appended claims.

DETAILED DESCRIPTION OF THE DRAWINGS

In utilizing a high pressure transfer device for the continuous hydraulic conveying of coal or like hard particulate material having non-uniform and irregular particle shapes, such as shown in U.S. Pat. No. 4,082,368 (the disclosure of which is hereby incorporated by reference herein) excessive wear of the screen and liner adjacent to the screen can occur. An exemplary screen (and liner) illustrating such wear, and the reasons therefor, is illustrated at 10 in FIG. 1. The screen includes a plurality of elongated bars 12 held together in spaced, parallel position at the ends thereof with a pair of transverse bars 13. Slots 14 are thus provided between each of the spaced bars 12. When a particle P of the hard material being conveyed becomes lodged in a slot 14, as the rotor associated with the high pressure transfer device rotates it engages the particle P and moves it along the slot 14 in which it is lodged until it comes to the end 15 of the slot. At this time, the particle P is carried into abrading contact with the transverse bar 13 until the particle B finally is broken up. The result of continuous repetition of this action is the formation of slots—illustrated at 16 in FIG. 1—in the transverse bar 13, such slots eventually causing excessive leakage of the high pressure transfer device, and requiring that the device be shut down for replacement of the screen 10. The slots 16 often even extend through the periphery of the liner 17 of the high pressure transfer device to the adjacent fluid port, causing even further leakage.

Figures 1, 3:
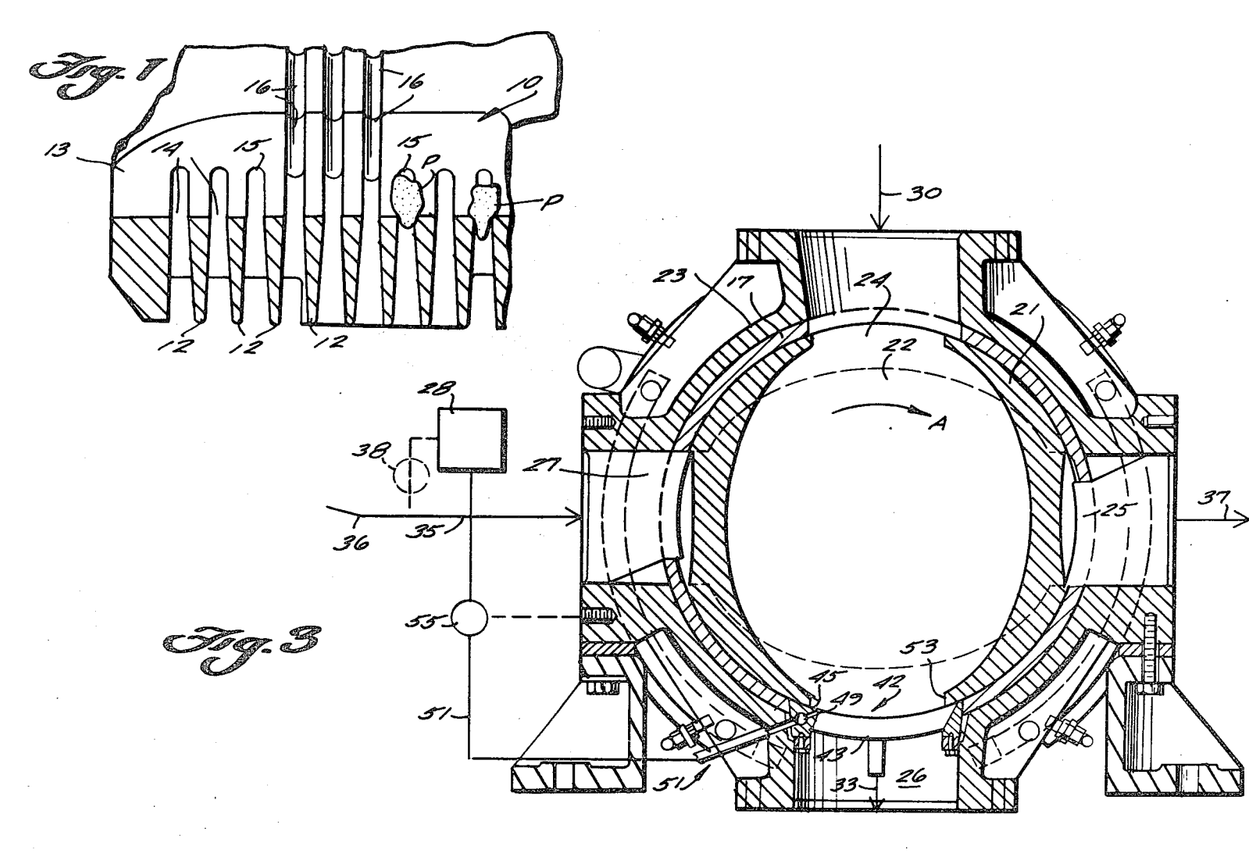
FIG. 1 is a detailed cross-sectional view of an exemplary prior art screen and liner illustrating lodging of hard particulate material therein, and excessive wearing of the screen as a result of the lodging of the hard particulate material particles in the slots of the screen.
FIG. 3 is a cross-sectional view taken along lines 3—3 of FIG. 2.
Figure 2:
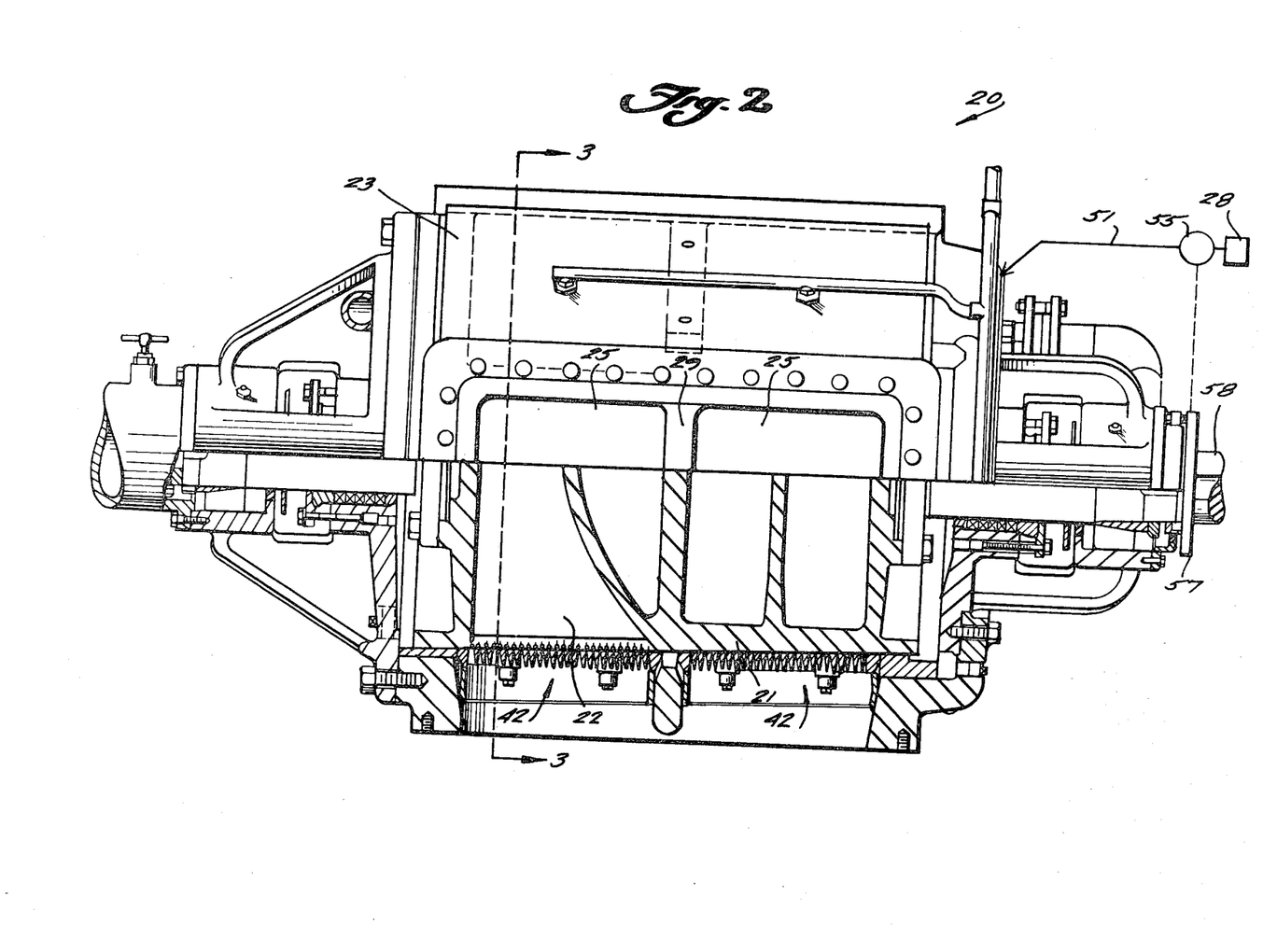
FIG. 2 is a side view, partly in cross-section and partly in elevation, of an exemplary high pressure transfer device according to the present invention.
Figure 4:
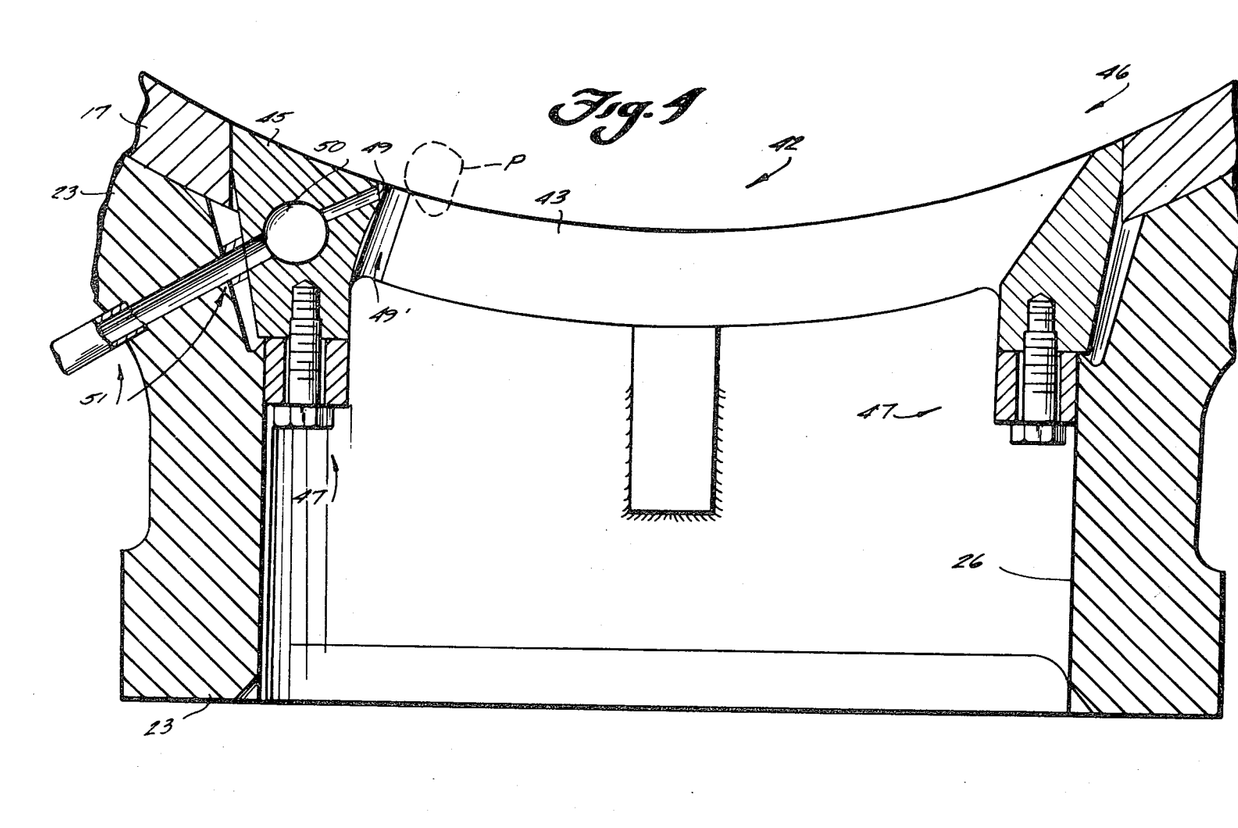
FIG. 4 is a detailed cross-sectional view of the screen, and related structure, in a device of FIG. 3.
Figure 5:
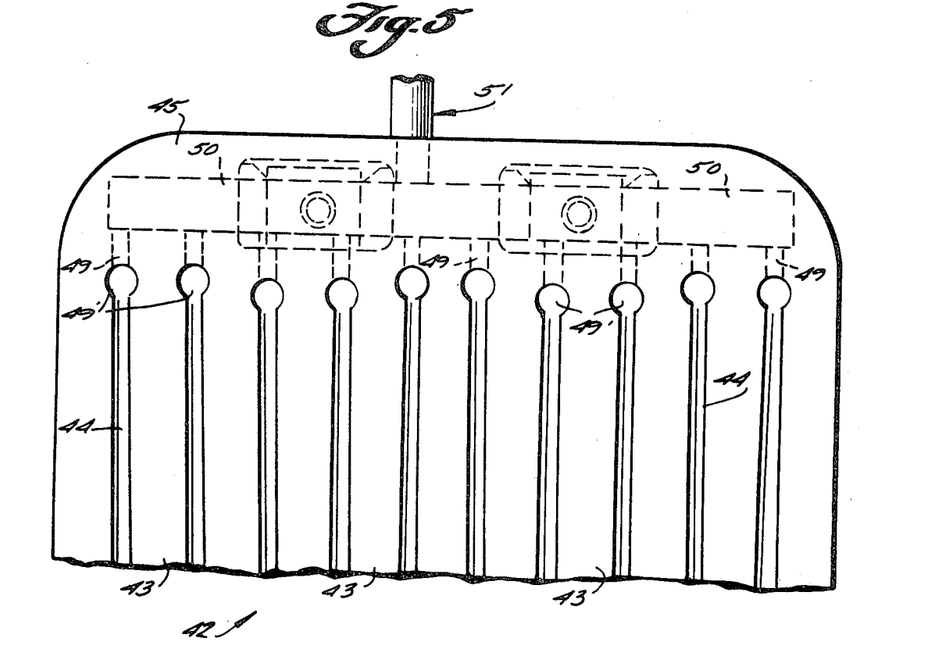
FIG. 5 is a top plan view of a portion of the screen of FIG. 4.
Figure 8:
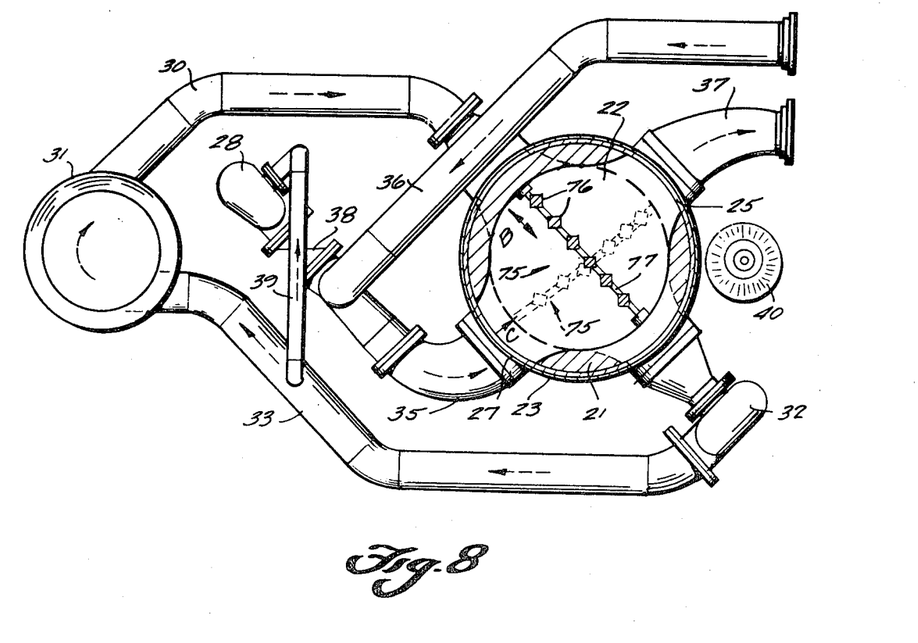
FIG. 8 is a top view, partly in cross-section and partly in elevation, of an exemplary system utilizing a high pressure transfer device with interiorly mounted screens.

The excessive wear problem illustrated in FIG. 1 is eliminated according to the present invention by utilization of the high pressure devices illustrated in FIGS. 2 and 3 or in FIG. 8. The conventional components of the high pressure device 20 of FIGS. 2, 3, and 8 include a pocketed rotor 21 having two rows of diametrically through-going pockets 22, each row containing two through-going pockets 22 perpendicular to each other. The two rows of pockets are parallel, one row being displaced 45° peripherally from it adjacent row. The rotor 21 is encased in a housing 23, which has a liner 17, the housing and liner having four ports equally spaced around the periphery thereof for registry with inlets to and outlets from said rotor pockets 22. The ports include a first port 24 to which liquid containing the hard particulate material is initially fed, a second port 25 through which the particulate material is pumped under high pressure, a third port 26 through which liquid is withdrawn, the liquid being screened during passage through the third port 26 so that particulate material above a predetermined size will not pass with the liquid through the third port 26, and a fourth port 27 through which liquid under high pressure from a high pressure pump 28 is fed to expel particulate material in a through-going pocket in registry with the fourth port 27, out the second port 25. Each port 24 through 27 is more than twice as wide as the sum of two pockets 22 in the pocketed rotor 21, and a divider 29 (see FIG. 2) is located midway in each housing port to separate the same into two parallel ports.

A particularly useful manner for mounting the high pressure device is illustrated in FIG. 8, although other particular interconnections for the device 20 may be provided. In the arrangement illustrated in FIG. 8, the first port 24 is connected by conduit 30 in a low pressure circulation loop to a receiving and mixing tank 31 for receiving the particles and mixing them with water, a low head centrifugal pump 32 being associated with the port 26 for feeding water through the conduit 33 to the receiving and mixing tank 31. A high pressure loop for the transfer device 20 is provided by the conduit 35 connected up to the fourth port 27. Pipe 36 originally brings water into the high pressure loop to operative association with the high pressure pump 28, and high pressure liquid with entrained particles is withdrawn from the device 20 through second port 25 into the conduit 37. There will be some leakage from the high pressure circulation loop to the low pressure loop, and this leakage will cause a rise in the water level in the mixing tank 31, which level will be sensed by a level control system which modulates the valve 38 associated with the high pressure pump 28 to keep the level constant. The leakage is drawn from the low pressure circulation loop through pipe 39 to the pump 28. Means are also provided, such as the motor 40 illustrated diagrammatically in FIG. 8, for rotating the rotor 21 about its axis of rotation so that the pockets 22 therein are sequentially brought into registry with the ports 24 through 27.

The conventional features of the high pressure transfer device and related system are described more completely in U.S. Pat. No. 4,082,368.

According to the embodiment of the invention illustrated in FIGS. 2 through 7, damage to the screen for screening out particles above a predetermined size so that they do not pass through the third port 26 into the low pressure circulation loop includes the screen assembly shown generally at 42. The screen includes a plurality of bars 43 elongated in the direction of rotation A of the rotor 21, with means being provided for mounting the bars 43 so that they are parallel to each other and spaced apart a predetermined distance, with slots 44 being provided between adjacent bars 43. Such means includes a pair of transverse bars 45, 46 on opposite ends of the bars 43. The transverse bar 45 is provided on the rearmost portion of the screen 42, in the direction of rotation A—that is the portion of the screen 42 that will be lastly placed in registry with a point on the rotor 21 during rotation thereof in the direction A. The screen 42 is mounted in place in the port 26 by screws 47, or other suitable means.

The transverse bar 45 includes fluid injection means. Such fluid injection means comprise a plurality of fluid injection nozzles 49, preferably one being disposed in operative association with each slot 44 between each set of adjacent bars 43, and pointing upwardly toward the tops of the bars 43 so that when fluid under pressure (preferably liquid under pressure) passes through the port 49 it will effect dislodgement of any particles P lodged in the slot 44 with which the nozzle 49 is associated, so that the particles P pass back into the through-extending pocket 22 of the rotor 21 from which they originally came. In order to minimize the chances that a particle will be squeezed into a groove 44 so that it cannot be dislodged, it is preferred to widen the opening at the interface between the end of the groove 44 and the port 49, as indicated at 49' in FIGS. 4 and 5. In order to allow for such widening, typically the screen 42 according to the present invention will have less grooves 44 formed therein than a like conventional screen. As illustrated in the drawings, preferably a header 50 is provided mounted in the transverse bar 45, which header communicates through the tubes and ports 51 with a source of fluid under high pressure (such as the pump 28—see the diagrammatic illustration in FIG. 3).

For most efficient operation, it is preferable to provide means for timing the fluid injection means 49, etcetera so that fluid is injected therethrough only when a trailing edge, in the direction of rotation of the rotor 21, of a through-going pocket in the rotor (such as edge 53 in FIG. 3) approaches the rearmost portion (i.e. 45) of the screen 42. Of course the timing means will be adjusted so that the fluid injection is not too soon before the edge 53 comes into association with the bar 45, or not too late so that it is ensured that all particles P which may be lodged in slots 44 will be dislodged back into the pocket 22.

The timing means preferably includes a valve 55 disposed in the fluid line 51 leading from the high pressure source 28 to the header 50, and means associated with the rotor 21 for effecting operation of the valve 55 to allow fluid to pass therethrough at a predetermined relative position of the rotor 21 with respect to the housing 23. Such valve operating means preferably comprise a cam 57 (for each screen 42) mounted on the shaft 58 defining the axis of rotation of the rotor 21, and a linearly movable cam follower 59 mounted for engagement with the cam 57 (and biased into contact therewith by a spring 60 or the like), and means responsive to the linear movement of the cam follower 59 for effecting operation of the valve 55. Particular attention is directed to FIGS. 6 and 7 which schematically illustrate two different forms the cam follower and means responsive to the linear movement of the cam follower 59, may take.

Figure 6:
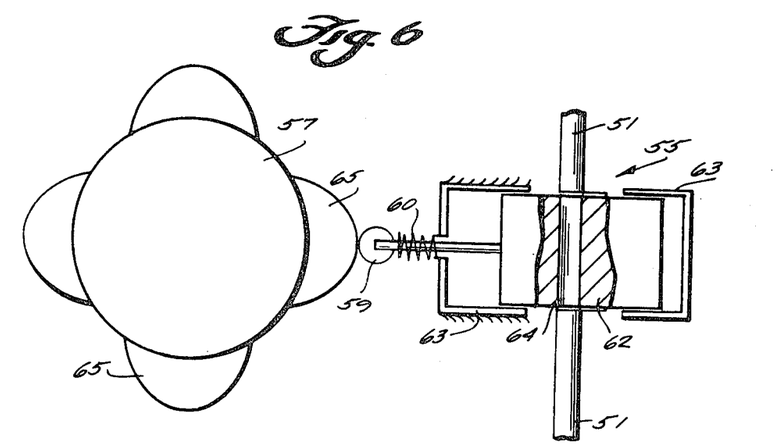
FIGS. 6 and 7 are modifications of exemplary timing structures utilized with the device of FIGS. 2 and 3.
Figure 7:
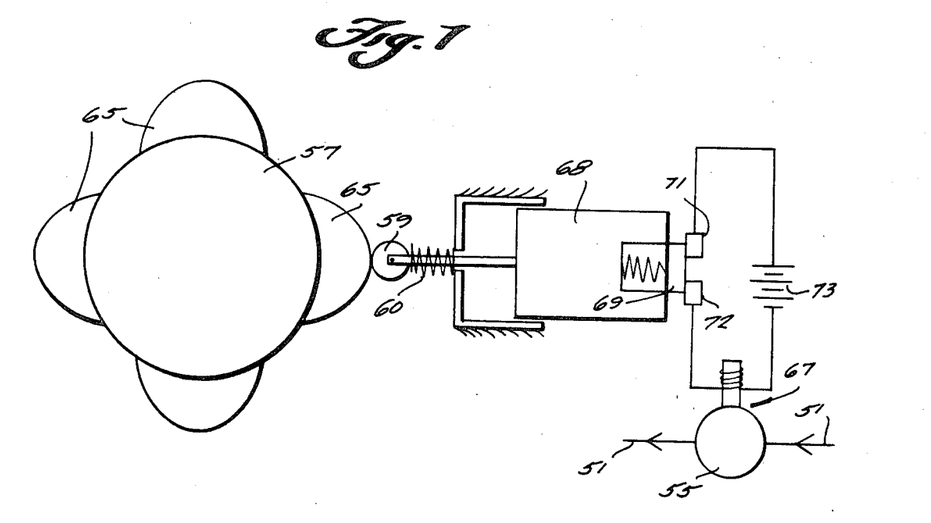

The timing means illustrated schematically in FIG. 6 comprises a linearly movable valving element 62 which is directly connected to the cam follower 59, and guided for movement in guides 63, the valving element 62 having a through-extending port 64 therein. As a lobe 65 of the cam 57 depresses the follower 59 against the bias of spring 60 (that position being illustrated in FIG. 6) the through-extending port 64 provides completion of a fluid path through the line 51, allowing fluid under pressure to be passed from the source 28 to the header 50. Appropriate seals are provided on the block 62 and surrounding structures. In the embodiment illustrated in FIG. 7, the valve 55 is a solenoid operated valve, the solenoid operator being illustrated generally at 67, and an electrical switching means is associated with the follower 59. For instance a block 68 having a spring biased bridging contact 69 formed on one end thereof is moved with the follower 59 against the bias of spring 60 by a cam lobe 65 so that the bridging contact 69 bridges stationary contacts 71, 72 disposed in series with the solenoid 67 and a source of emf 73, to complete the circuit causing the solenoid 67 to energize and the valve 55 to be opened to allow passage of high pressure fluid through the line 51. Of course other suitable controls may be provided for the valve 55 as desired, such as electronic, radio responsive, light responsive, or other controls.

Figure 9:
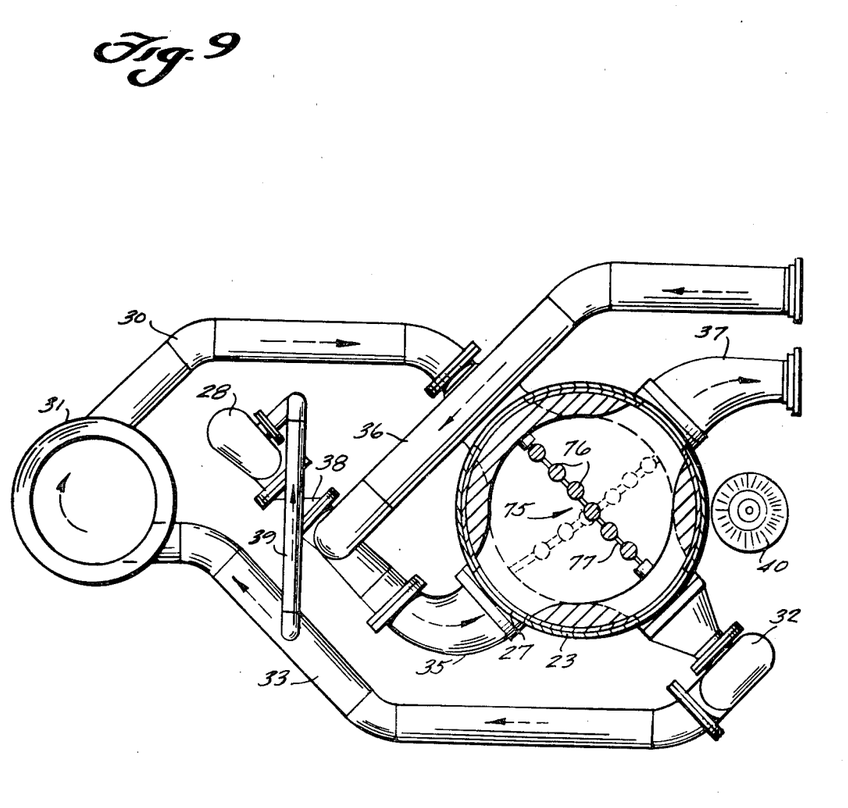
FIG. 9 is a view identical to FIG. 8 with a modified interiorly mounted screen.

In the embodiment illustrated in FIGS. 8 and 9, damage to the screen is prevented by providing a screen 75 mounted interiorly of each pocket 22 of the rotor 21, rather than by providing the screens 42 in the third port 26. As illustrated in FIGS. 8 and 9, the pocket 22 is widest at its middle, being much wider there than at the inlet or outlet therefor. A particularly suitable screen for mounting interiorly of a pocket 22 according to the present invention is formed of a plurality of elongated bars 76 that are square (FIG. 8) or circular (FIG. 9) in cross-section. The bars are mounted together so that they are spaced a predetermined distance in a dimension B, perpendicular to the direction C of liquid and particle flow through the pocket 22, and are parallel to each other, and are oriented so that they present a diamond—FIG. 8—or circular—FIG. 9—configuration to the fluid flow C no matter which end of the pocket 22 the fluid is flowing into. Transverse bars 77 may be provided at opposite ends of the bars 76, to which the bars 76 are welded, to provide such attaching means. The screen described herein is easy to construct, durable, and its degree of effectiveness is not dependent upon which end of the pocket that the liquid and particles are flowing into.

In operation of the device illustrated in FIGS. 2 through 7, liquid containing hard particulate material is fed into a pocket 22 through port 24 as the rotor 21 is continuously rotating in direction A, while liquid is withdrawn through the port 26 and particles in the pocket 22 above a predetermined size are maintained within the pocket by the screening means 42. As the rotor 21 continues rotation and the trailing edge 53 of the pocket containing the particles approaches the transverse bar 45, a cam lobe 65 depresses a cam follower 59 to operate valve 55 so that liquid under high pressure flows from high pressure source 28 through line 51 to header 50 through each of the fluid injection ports 49, the liquid under high pressure dislodging any particles P that may be lodged in the slots 44 between tars 43 so that the particles P flow back into the pocket 22, and do not cause damage to the bar 45. The pocket containing the particles continues its rotation in direction A until it comes into registry with the ports 27 and 25, liquid under high pressure passing from the high pressure pump 28 through the port 27 to expel the liquid and particles in the pocket 22 out the port 25 into the high pressure conduit 37. The same action takes place for each of the pcokets of the rotor 21 during continuous rotation, a cam 57 having four lobes 65 spaced symmetrically therearound being provoided for each of the two screening means 42, the lobes 65 of the respective cams 57 being displaced peripherally from each other the same amount (i.e. 45°) as the adjacent rows of the pockets 22 in the rotor 21.

In operation of the device illustrated in FIGS. 8 and 9, the action is the same except that screening is effected by the interior screens 75, again there being no possibility of damage to the screen because of the location of the screen in a position where the rotor 21 cannot force hard particles P being conveyed directly into abrading contact therewith.

It will thus be seen that according to the present invention a device and method have been provided for the continuous conveying of hard particulate material utilizing a high pressure transfer device without damage to the screen of the high pressure transfer. While the invention has been herein shown and described in what presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent devices and methods.

What is clamed is:

1. A high pressure transfer device including a pocketed rotor containing a pair of diametrically through-going pockets perpendicular to each other; a housing enclosing said rotor, said housing having four ports equally spaced around the periphery thereof for registry with inlets to and outlets from said through-going rotor pockets; means for rotating said rotor in said housing with respect to said ports in a given direction of rotation; and a screen operatively associated with one of said ports of said housing for allowing passage of liquid and particles below a predetermined size in a rotor pocket therethrough, but preventing passage of particles larger than a predetermined size therethrough; and pumping means for pressurizing liquid flowing through a port opposite said port with which said screen is associated, for passing pressurized liquid into said rotor pockets; wherein the improvement comprises:

fluid injection means operatively associated with a rearmost portion of said screen, relative to the direction of rotation of said rotor, for injecting fluid to effect dislodgement of any particles that might be lodged in said screen; and means for timing said fluid injection means so that fluid is injected therethrough substantially only when a trailing edge, in the direction of rotation of said rotor, of a through-going pocket in said rotor approaches said rearmost portion of said screen.

2. A device as recited in claim 1 wherein said timing means includes a valve disposed in a fluid line leading to said fluid injection means; and means associated with said rotor for effecting operation of said valve to allow fluid to pass therethrough at a predetermined relative position of said rotor with respect to said housing.

3. A device as recited in claim 2 wherein said means associated with said rotor for effecting operation of said valve comprises a cam mounted for rotation with said rotor; a linearly moveable cam follower mounted for engagement with said cam; and means responsive to the linear movement of said cam follower for effecting operation of said valve.

4. A device as recited in claim 3 wherein said means responsive to movement of said cam follower comprises an electrical switching means, and wherein said valve is a solenoid operated valve, said electrical switching means operatively connected to said solenoid operated valve.

5. A device as recited in claim 3 wherein said means responsive to movement of said cam follower comprises a linearly moveable valving element of said valve.

6. A device as recited in claims 1, 2, or 3 wherein said screen comprises a plurality of bars elongated in said direction of rotation of said rotor, and spaced from each other in a dimension parallel to the axis of rotation of said rotor; and wherein said fluid injection means comprises a header operatively connected to a high pressure source of fluid, and an individual fluid injection nozzle disposed between adjacent bars of each of the plurality of bars in the spaces therebetween; each of said nozzles being operatively connected to said header and being disposed just below the tops of the bars that it is disposed between, pointing upwardly toward the bar tops.

7. A device as recited in claim 1 wherein said screen comprises a plurality of bars elongated in said direction of rotation of said rotor, and spaced from each other in a dimension parallel to the axis of rotation of said rotor, and a pair of transverse end bars joining each of said elongated bars at the ends thereof; and wherein said fluid injection means comprises an individual fluid injection nozzle disposed between adjacent bars of each of the plurality of bars in the spaces therebetween, each of said nozzles being operatively connected to a source of fluid under pressure, and each of said nozzles being mounted in one of said transverse end bars.

8. A device as recited in claim 1 wherein said rotor contains two rows of said diametrically through-going pockets, each row containing two said through-going pockets perpendicular to each other, the two rows of pockets being parallel and one row being 45° displaced peripherally from its adjacent row; and each of said housing ports being more than twice as wide as the sum of two pockets in said pocketed rotor with a divider being located midway in each housing port to separate the same into two parallel ports.

9. A device as recited in claim 1 wherein said fluid injection means comprises means for introducing liquid under pressure towards said screen to effect dislodgement of particles that might be lodged in said screen to flow back into a said through-going pocket in said rotor.

10. A high pressure transfer device including a pocketed rotor containing a pair of diametrically through-going pockets perpendicular to each other; a housing enclosing said rotor, said housing having four ports equally spaced around the periphery thereof for registry with inlets to and outlets from said through-going rotor pockets; means for rotating said rotor in said housing with respect to said ports in a given direction of rotation; and a screen operatively associated with one of said ports of said housing for allowing passage of liquid and particles below a predetermined size in a rotor pocket therethrough, but preventing passage of particles larger than a predetermined size therethrough, said screen comprising a plurality of bars elongated in said direction of rotation of said rotor, and spaced from each other in a dimension parallel to the axis of rotation of said rotor; and pumping means for pressurizing liquid flowing through a port opposite said port with which said screen is associated, for passing pressurized liquid into said rotor pockets; and fluid injection means associated with said screen for injecting fluid to effect dislodgement of any particles that might be lodged in said screen, said fluid injection means comprising: a header operatively connected to a high pressure source of fluid, and an individual fluid injection nozzle disposed between adjacent bars of each of the plurality of bars in the spaces therebetween; each of said nozzles being operatively connected to said header and being disposed just below the tops of the bars that it is disposed between, pointing upwardly toward the bar tops.

11. A high pressure transfer device including a pocketed rotor containing a pair of diametrically through-going pockets perpendicular to each other; a housing enclosing said rotor, said housing having four ports equally spaced around the periphery thereof for registry with inlets to and outlets from said through-going rotor pockets; means for rotating said rotor in said housing with respect to said ports in a given direction of rotation; and a screen operatively associated with one of said ports of said housing for allowing passage of liquid and particles below a predetermined size in a rotor pocket therethrough, but preventing passage of particles larger than a predetermined size therethrough, said screen comprising a plurality of bars elongated in said direction of rotation of said rotor, and spaced from each other in a dimension parallel to the axis of rotation of said rotor, and a pair of transverse end bars joining each of said elongated bars at the ends thereof; and pumping means for pressurizing liquid flowing through a port opposite said port with which said screen is associated, for passing pressurized liquid into said rotor pockets; and fluid injection means associated with said screen for injecting fluid to effect dislodgement of any particles that might be lodged in said screen, said fluid injection means comprising an individual fluid injection nozzle disposed between adjacent bars of each of the plurality of bars in the spaces therebetween, each of said nozzles being operatively connected to a source of fluid under pressure, and each of said nozzles being mounted in one of said transverse end bars.

12. A device as recited in claims 7 or 11 wherein each of said nozzles is mounted in a side of said transverse end bar, and below the tops of said elongated bars, and points upwardly toward the tops of said elongated bars and generally opposite the direction of rotation of said rotor.

13. A method of continuously conveying hard particulate material, the particles having on-uniform and irregular shapes, such as coal, utilizing a high pressure transfer device including a pocketed rotor containing a pair of diametrically through-going pockets perpendicular to each other, a housing enclosing the rotor and having four ports equally spaced around the periphery thereof for registry with inlets and outlets from the through-going pockets in the rotor, and at least one screen associated with the housing and rotor for allowing passage of liquid and particles smaller than a predetermined size therethrough, but preventing passage of particles larger than the predetermined size therethrough; the method comprising the steps of (a) continuously feeding liquid containing the hard particulate material into a first of the housing ports for entry into a through-going pocket of the rotor;

(b) rotating the rotor in a given direction of rotation, so that it progressively rotates past each of the housing ports;

(c) providing withdrawal of liquid introduced through the first port from through-going pockets of the rotor through a third port of the housing, opposite the first port, and screening the particulate material above a predetermined size out of the liquid passing through the third port with the screen;

(d) pumping liquid under high pressure toward the rotor through a fourth port of the housing, the fourth port being located before the first port in the direction of rotation of the rotor, and between the first and third ports;

(e) providing withdrawal of liquid through a second port, located opposite fourth port; and (f) positively preventing damage to the screen as a result of particles of the hard particulate material being trapped therein and carried along the screen by the rotor into abrading contact with solid portions of the screen by injecting fluid under pressure into the screen to effect dislodgement of particles that may be lodged in the screen, and timing the fluid injection so that fluid is injected substantially only when a traling edge, in the direction of rotation of the rotor approaches a rearmost portion of the screen, in the direction of rotation of the rotor.

14. A method as recited in claim 12 wherein said timing method step is accomplished by operatively tying the fluid injection to the rotation of the rotor.

15. A method as recited in claim 13 wherein step (f) is further accomplished by injection liquid under pressure to effect dislodgement of particles that may be lodged into the screen back toward a through-extending pocket in the rotor.

* * * * *